United States Patent [19]

Feldhaus et al.

[11] Patent Number: 5,307,710
[45] Date of Patent: May 3, 1994

[54] TWO-MASS FLYWHEEL

[75] Inventors: Reinhard Feldhaus, Ebenhausen; Bernhard Schierling, Kürnach; Andreas Förster, Schweinfurt; Hilmar Goebel, Grafenrheinfeld, all of Fed. Rep. of Germany

[73] Assignee: Fichtel & Sachs AG, Schweinfurt, Fed. Rep. of Germany

[21] Appl. No.: 931,932

[22] Filed: Aug. 18, 1992

[30] Foreign Application Priority Data

Aug. 30, 1991 [DE] Fed. Rep. of Germany ....... 4128868

[51] Int. Cl.$^5$ ............ F16D 3/66; F16F 15/121
[52] U.S. Cl. .................. 74/574; 74/572; 464/68
[58] Field of Search ............. 74/573 R, 573 F, 574, 74/572; 192/106.2; 464/68 X, 64, 66

[56] References Cited

U.S. PATENT DOCUMENTS

| 4,850,932 | 7/1989 | Kagiyama et al. | 74/574 X |
|---|---|---|---|
| 5,032,107 | 7/1991 | Umeyama et al. | 74/574 X |
| 5,119,692 | 6/1992 | Naudin | 74/573 F |
| 5,120,276 | 6/1992 | Maucher et al. | 74/574 X |
| 5,123,877 | 6/1992 | Maucher et al. | 74/574 X |
| 5,135,092 | 8/1992 | Jäckel | 74/574 X |
| 5,168,773 | 12/1992 | Janiszewski | 74/574 |

FOREIGN PATENT DOCUMENTS

| 305189 | 3/1989 | European Pat. Off. | 74/574 |
|---|---|---|---|
| 3721712 | 1/1988 | Fed. Rep. of Germany . | |
| 3916575 | 11/1990 | Fed. Rep. of Germany . | |
| 9017936 | 10/1991 | Fed. Rep. of Germany . | |
| 4134406 | 4/1992 | Fed. Rep. of Germany . | |
| 957698 | 12/1947 | France | 74/574 |
| 2624236 | 6/1989 | France . | |
| 2640709 | 6/1990 | France . | |
| 2066416 | 7/1981 | United Kingdom . | |
| 2241560 | 9/1991 | United Kingdom . | |

*Primary Examiner*—Vinh T. Luong
*Attorney, Agent, or Firm*—Brumbaugh, Graves, Donohue & Raymond

[57] ABSTRACT

The invention proposes a two-mass flywheel for the drive line of a motor vehicle. The two-mass flywheel comprises a torsional vibration damper with, distributed over the periphery, a plurality of coil springs (31, 31') which are braced on one another via sliding shoes (43). The sliding shoes (43) guide the springs (31) in a passage (29). End shoes (41) bearing on the end springs (31') and the sliding shoes (43) have extension pieces which prevent the springs (31, 31') bearing on the outer contours of the passage (23) at relatively high rotary speeds. The passage contains viscous lubrication so that in conjunction with slip-promoting coating on the end shoes (41) and sliding shoes (43) a very low basic friction is achieved.

42 Claims, 7 Drawing Sheets

TWO-MASS FLYWHEEL

BACKGROUND OF THE INVENTION

The invention relates to a two-mass flywheel to be disposed in the drive line of a motor vehicle driven by an internal combustion engine.

Known from DE-A-37 21 712 is a two-mass flywheel having two flywheels which are mounted to rotate relatively to each other and which are coupled to each other in torsionally elastic manner by a torsional vibration damping means. While the first of the two flywheels is fixed on the crankshaft of the internal combustion engine, the second flywheel carries a friction clutch via which the gear mechanism which is on the downstream side in the drive line can be isolated from the internal combustion engine when starting up and changing gear.

Where the prior art two-mass flywheel is concerned, the first flywheel contains a passage circularly enclosing the pivot axis and in which a plurality of comparatively long coil springs are disposed and each of which is independently controlled by end shoes of the torsional vibration damping means. The coil springs are connected in parallel with one another but by reason of their considerable length they permit a comparatively wide angle of relative rotation between the two flywheels. In order to reduce friction, the passage is at least partially filled with a viscous lubricant.

By reason of their great length, the coil springs of the prior art two-mass flywheel are, during operation, by virtue of the compression and centrifugal force, pressed against the inner wall surface of the first flywheel which radially outwardly defines the passage. Due to the friction of the coil springs against the inner wall surface, even at low rotary speeds and with minimal angles of rotation of the flywheels in respect of each other, a controllable but high level of basic friction results.

SUMMARY OF THE INVENTION

A main object of the invention is to indicate a two-mass flywheel, the basic friction in which can be kept at a clearly defined and low level and indeed with as far as possible a constant damping action even over a comparatively long effective life.

In order to resolve this problem, the invention is based on the premise of a two-mass flywheel intended to be disposed in the drive line of a motor vehicle driven by an internal combustion engine and which comprises:

A first flywheel adapted to be mounted on a crankshaft of the internal combustion engine and in the same axis as its axis of rotation, a second flywheel mounted to rotate about the same axis in relation to the first flywheel and serving as a carrier for a friction coupling in the drive line and coupling the two flywheels to each other in rotationally elastic manner, a torsional vibration damping means with a plurality of coiled springs disposed on a common mean diameter in a passage in the first flywheel and extending arcuately about the axis of rotation.

According to the invention, it is envisaged that the torsional vibration damping means comprise, for coupling the two flywheels in rotatingly elastic fashion, at least one set of at least two individual coil springs which, connected in series one after the other, are disposed in the passage, and in that between mutually facing ends of peripherally adjacent coil springs of the set there is in each case, adapted for movement in relation to the two flywheels, a sliding shoe which guides the mutually facing ends of the adjacent coil springs in the passage.

The sliding shoes disposed between the individual preferably cylindrical coil springs permit of torsional springing with a low spring stiffness. Since the individual coil springs are separated from one another by sliding shoes, there is no danger of the coil springs coming into direct contact with the inner wall face of the first flywheel which outwardly defines the passage. Whereas in the case of the prior art two-mass flywheel pre-curved coil springs have to be used in practice, manufacture and handling of the coil springs in the case of the two-mass flywheel according to the invention are simplified in that normal coil springs having a rectilinear spring axis can be used. By reason of the serial connection of the coil springs, a low spring rating is achieved. By combining coil springs of differing stiffness, as is envisaged in preferred embodiments, matching of the damping properties is facilitated.

The sliding shoes preferably have a convex radially outer portion bearing on the inner wall surface of the first flywheel which radially outwardly defines the passage and in this region they are preferably constructed to promote slip and to suffer from minimal wear and tear. The slip-promoting construction leads to a low basic friction so that the higher level of friction which may possibly be required in specific operating conditions can be generated under control by separate friction means. The low level of basic friction improves the possibilities of attuning the entire torque transmitting system. The low level of basic friction furthermore ensures that for instance during idling and at a very low torque loading on the transmission shaft, gear-box noises can be more easily eliminated.

The sliding shoes as a whole may consist of a slip-favourable material. However, they can also be manufactured from different materials and only the areas intended to bear on the inner wall surface of the first flywheel may consist of a slip-promoting and low-wear material, while a different material is used for the other areas. For example, the sliding shoes may consist of metal and be hardened in the region of their bearing surfaces. However, it is also possible to make the sliding shoes from metal and to coat the convexly curved bearing portion with a slip-favourable coating.

Particularly advantageous are embodiments in which the sliding shoes are produced completely from synthetic plastics material. This procedure makes it easily possible to achieve a slip-favourable pairing of materials and minimal weight, so that even at high rotary speeds the sliding shoes generate only comparatively low friction moments. The sliding shoes are preferably made from a fibre-reinforced synthetic plastics material, the reinforcing material used being for example glass fibres or carbon fibres, a slip-favourable coating or admixture being provided especially in the convexly curved bearing portion. The basic material may for example be thermoplastics material, particularly polyamide which may contain a proportion of for example 30 to 50% glass fibres and an admixture of Teflon in order to improve the sliding properties.

In order to be able to guide the coil springs more satisfactorily, it is suggested that the sliding shoes, in their convexly curved portion, be provided in both peripheral directions with extension members which guide the coil springs in relation to the sliding shoes and reduce their relative movement in a peripheral direction to a minimum. These measures reduce the basic friction. In this connection, it is also expedient if the outer contours of the convexly curved portion including the two extension members on the sliding shoes is adapted to the radius of the inner wall surface of the first flywheel, i.e. has the same or a slightly smaller radius of curvature.

In a preferred development of the invention, the spring supporting surfaces for the ends of the coil springs are of substantially circular and plane construction and extend substantially at right-angles to the spring axis. In the radially inner region, short spring guiding extension pieces project towards both peripheral directions and guide the coil springs also radially inwardly in a clearly defined manner.

The ends of the terminal coil springs of each set which are in each case outermost in the peripheral direction are preferably guided in spring pots or end shoes which also serve to initiate force into the coil spring set. Expediently, the end shoes in turn have a substantially circular plane spring supporting surface which extends substantially at right-angles to the spring axis and, for application to control elements of the torsional vibration damping means, they are provided with prismatic guides which consist of two preferably plane prism surfaces extending in the direction of the axis of rotation. Viewed in an axial cross-sectional plane, a straight line may pass through the point of intersection of these surfaces at one end and through the point of intersection between the spring axis and the spring supporting surface which, in a state of rest, forms an acute angle with the spring axis but which, with maximum compression of the coil spring, extends substantially in the direction of the spring axis. Particularly at maximum loadings of the relevant coil spring, a reliable transmission of the forces from the coil spring via the end shoe to the control element is thus guaranteed. At the same time, by reason of this arrangement, the coil spring becomes pre-tensioned radially inwardly under a heavy loading, which counteracts the endeavour of the coil spring to move radially outwardly under relatively high rotary speeds.

Also each end shoe has in its radially outer portion an extension member which radially outwardly masks the end coil spring at least over a part of its length. This ensures that at maximum rotary speeds the coil springs—if at all—can bear radially outwardly on the end shoe only so that direct contact of metal on metal of the first flywheel is avoided. The outer contours of the end shoe are again, according to the sliding shoes, adapted to the radius of the passage in the first flywheel, i.e. have a radius of curvature which is equal to or slightly less than the radius of the radially outer inner wall surface of the passage.

A particularly low basic friction can be achieved if the outer contours of the end shoes, when at rest, are at a distance from the inner wall surface of the first flywheel so that the end shoe does not in any way contribute to the basic friction.

By a suitable shaping of the prismatic guide of the end shoes, particularly by a suitable choice of the angle of inclination of the radially outer prism surface, by a suitable choice of the friction coefficients of the materials which bear on one another and the initial tension of the coil springs, it is possible to ensure that by virtue of centrifugal force the end shoe moves radially outwardly at a given rotary speed and comes to bear on that inner wall surface which radially outwardly defines the passage. In this way, it is possible to ensure a controlled onset of friction of the end shoes with effect from a specific rotary speed.

Also each end shoe is of low wear and slip-favourable construction at least in its convexly curved portion which bears on the inner wall surface of the passage in the first flywheel. Here, too, the entire end shoe can be produced from a slip-promoting material. However, it can also be made from metal and at least its radially outer portion, particularly in the region of its extension member, may be hardened. This type of protection against wear and tear can be produced with particular ease. However, it is also possible to make the end shoe from metal and to provide in the radially outer zone, particularly in the region of the extension member, a coating which is favourable to slip.

From the point of view of optimum manufacturing costs and weight, it is particularly advantageous to produce the end shoe from synthetic plastics material. By optimising weight, not only is the weight of the entire arrangement reduced, but also the effect of centrifugal force is reduced, so that the increase in friction force with increasing speed becomes quite minimal. Under a heavy loading, it is advantageous for the synthetic plastics material to be reinforced for example by glass fibres or carbon fibres, the radially outer zone of the extension member being provided with a slip-favourable coating or admixture, for example of Teflon. These measures result in the advantages already indicated in respect of the sliding shoes.

For better guidance of the coil springs, it is furthermore proposed that the circular flat spring supporting surfaces of the end shoes should run out radially inwardly in a spring guiding extension piece extending in the direction of the spring axis and being only comparatively short. Furthermore, it is proposed to provide in the region of the extension member on the end shoe one or a plurality of axially adjacently disposed radially outwardly open chamfers in the form of lubricating grooves which have their greatest depth at the free end of the extension members running out to nothing in the direction of and before reaching the surfaces of the prismatic guide. The viscous material at least partially filling the passage in a preferred development of the invention creates a wedge-shaped film of lubricant, particularly at a high relative velocity, and this minimises not only friction but also wear and tear. Appropriate measures may also be advantageously applied to the sliding shoes so that here, too, friction and wear can be considerably reduced under control.

In a preferred embodiment of the invention, the first flywheel is composed of a plurality of parts and comprises in particular a primary disc close to the internal combustion engine and disposed rigidly radially inwardly on a hub, a cover disc remote from the internal combustion engine and maintained at a distance from the primary disc, and a ring bounded inwardly by an annularly cylindrical surface and holding the two discs together but apart from each other in the region of their outer diameter so that an encircling passage is formed which is of rectangular cross-section at least in its radially outer part. On its inner wall surface, the ring is preferably finely machined and is provided on its outside diameter expediently with an integral starter gear ring. The fine machining can be of the metal cutting type. Advantageously, however, it is also possible to achieve a non-cutting surface compaction by rolling. The individual parts of the first flywheel can be connected to one another in various ways. Where there is sufficient space, the parts can be riveted to one another. By reason of the minimal space requirement, however, a welded joint is preferred, which at the same time allows the components to be connected in a fluid-tight manner.

The end shoes and the sliding shoes are in cross-section and at least in the radially outer portion of the passage cross-section, adapted to this latter, the coil springs being guided in the axial direction of the flywheels by the cover disc and the primary disc. The end shoes and the sliding shoes are preferably laterally guided not only in the region of their extension members but additionally too by lateral guide surfaces which extend substantially as far as the radial height of the spring axes of the coil springs. Thus it is possible to ensure that the end shoes and sliding shoes do not tend to twist and become tilted.

The extension members on the end shoes and sliding shoes are advantageously used as end stops to limit the maximum compression of the coil springs. In this way, however, it is possible not only to limit the maximum loading on the coil springs but also the spring characteristic of the spring set can be influenced so that with an increasing angle of rotation the spring stiffness alters and, in particular, increases. In order to limit the mass of the end shoes and sliding shoes, the extension members can however be shortened in the peripheral direction while between any two mutually facing extension members there is provided a freely movably disposed bracing member for limiting spring travel. This makes it possible to reduce basic friction at least in the medium speed and medium torque loading range.

In a preferred embodiment, the serially disposed coil springs of the set have differing spring ratings. In this way, it is possible to achieve a kinked spring characteristic in which the spring stiffness increases with increasing angle of relative rotation of the flywheels. Viewed in the direction of torque flow, the spring of greatest stiffness is expediently in the first position. The end shoe and sliding shoe cooperating with this coil spring performs the least friction work in this developed embodiment, in relation to the passage in the first flywheel. At low loading and with minimal relative rotation, therefore, an extremely low basic friction results.

Expediently, the torque is passed from the first flywheel to the set of coil springs via segments disposed on both sides in the primary disc and the cover disc and which have contours which match the prismatic surfaces of the end shoes. The segments can be easily produced separately and prior to assembly of primary disc, cover disc and ring, be fixed on some suitable location on the inside of primary disc or cover disc. Fixing can be accomplished by tight riveting or by welding. For the transmission of force from the end springs of the coil spring set, preferably a hub disc is provided which has radially projecting noses, the contours of which are adapted to match the prismatic surfaces of the end shoes. The hub disc is disposed radially within the zone of the coil springs axially between two lateral discs, the inner edge of its central aperture being guided radially on encircling edges integrally formed on the lateral discs. The lateral discs are torsionally elastically coupled to the hub disc via further springs which are disposed parallel with one another and which may possibly be actuated one after another according to the angle involved. Whereas the afore-described sets of coil springs form a first spring stage of the torsional vibration damping means, the further springs form, in series with the first spring stage, a second spring stage disposed in the space in the first spring stage and ensuring additional progressiveness of the spring characteristic.

The two lateral discs are shaped so that they are directed towards each other axially, radially within the aperture in the hub disc and they lie flat on each other adjacent the shaped portion. In this region, the lateral discs are secured rigidly to the second flywheel by rivets. Such an embodiment is space-saving and permits of simple radial guidance of the hub disc. To limit the angle of rotation of the second spring stage, lugs may project radially inwardly from the central aperture in the hub disc and engage peripherally defined pockets in the two lateral discs. Expediently, the pockets extend radially inwardly into the region of the adjacently disposed surfaces of the lateral discs and are slightly less deep in an axial direction than is the thickness of the material used for the lateral discs. Thus, the rotating angle limiting means can be disposed in the region radially outside the rivets and can be made outwardly fluid-tight. Preferably, the second flywheel extends at a slight axial distance from and alongside the cover disc in a radial direction. The second flywheel is, in the region of the rivets, provided with a shoulder extending axially on the lateral discs, its inside diameter being supported on a bearing which is in turn seated on an outside diameter of the hub of the first flywheel. Thus, the shoulder can be made sufficiently long in the axial direction without excessively restricting the space requirement for the lateral discs of the second spring stage. For axially fixing the second flywheel which expediently constitutes a counter-pressure plate for the friction clutch, in relation to the bearing, it is possible on the one hand to provide an integral flange on the second flywheel while on the opposite side the radially inner portions of the lateral discs can be used for axial fixing.

In order to prevent the viscous medium running out of the passage, a seal is disposed between the radially inner end portion of the cover disc of the first flywheel and that lateral disc of the second spring stage which is close to the second flywheel, radially between its springs and the rivets. Advantageously, this seal is formed by an annular sealing element which constitutes a motion seal in respect of the lateral disc, on the one hand, and a plate spring element, on the other, the inside diameter of this latter bearing on the sealing element while its outside diameter bears on the cover disc, in fact in such a way that there is no relative movement at this location. On the one hand, this prevents viscous medium emerging to the outside and on the other dirt is prevented from penetrating the interior.

The fact that the plate spring element is guided rotationally rigidly on the cover disc can be achieved for example by having a sufficiently high friction coefficient which must in any case be greater than the friction coefficient between the sealing element and the lateral disc. A rotationally rigid connection can however also be established by form closure between the outside diameter of the plate spring element and the cover disc. To this end, the plate spring element has on its outside diameter a plurality of radially projecting noses which engage corresponding recesses in the cover disc. For sealing purposes, it is possible to provide radially within this area a supporting bead on the cover disc, on which the plate spring element can rest uninterruptedly in the peripheral direction. However, if a cover disc is produced from relatively thin metal plate, it is also possible to press out from the cover disc an intermittent encircling corrugation extending towards the primary disc and to have the noses on the plate spring element engage the breaks. In this case, the plate spring element is provided radially within the noses with an encircling supporting bead which rests tightly on the cover disc. In this case, it is advantageous that both the cover disc and also the plate spring element can be produced inexpensively from relatively thin-gauge sheet metal parts.

In its radially outer portion, the sealing element preferably has, directed away from the cover plate, an encircling sealing bead on which the radially inner portion of the plate spring element rests with initial tension. In its radially inner region, the sealing element is provided with an intermittent extension piece which projects axially beyond the sealing bead and in the back of which engage radially inwardly directed projections on the plate spring element. This rotationally rigid connection ensures that the motion seal is effective between the sealing element and the lateral disc.

The transmission of force from the coil spring set disposed in the passage to the centrally mounted hub disc is accomplished via noses which project radially from the hub disc. Between the noses, at least some of the coil springs have a radially inner part of their windings resting on the peripheral contours of the hub disc. The peripheral contours and the position of the coil springs are so selected that there is a radial pre-tension in the coil springs radially inwardly towards the pivot axis. This initial tension makes it possible to use a greater spring volume of the coil springs. Expediently, the radial initial tension is so attuned to the spring dimensions that in operation the coil spring becomes lifted off the peripheral contours by centrifugal force. The disposition is expediently such that the coil spring will have been lifted off already at idling speed of the internal combustion engine so contributing nothing to the basic friction during operation.

The various features of novelty which characterise the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
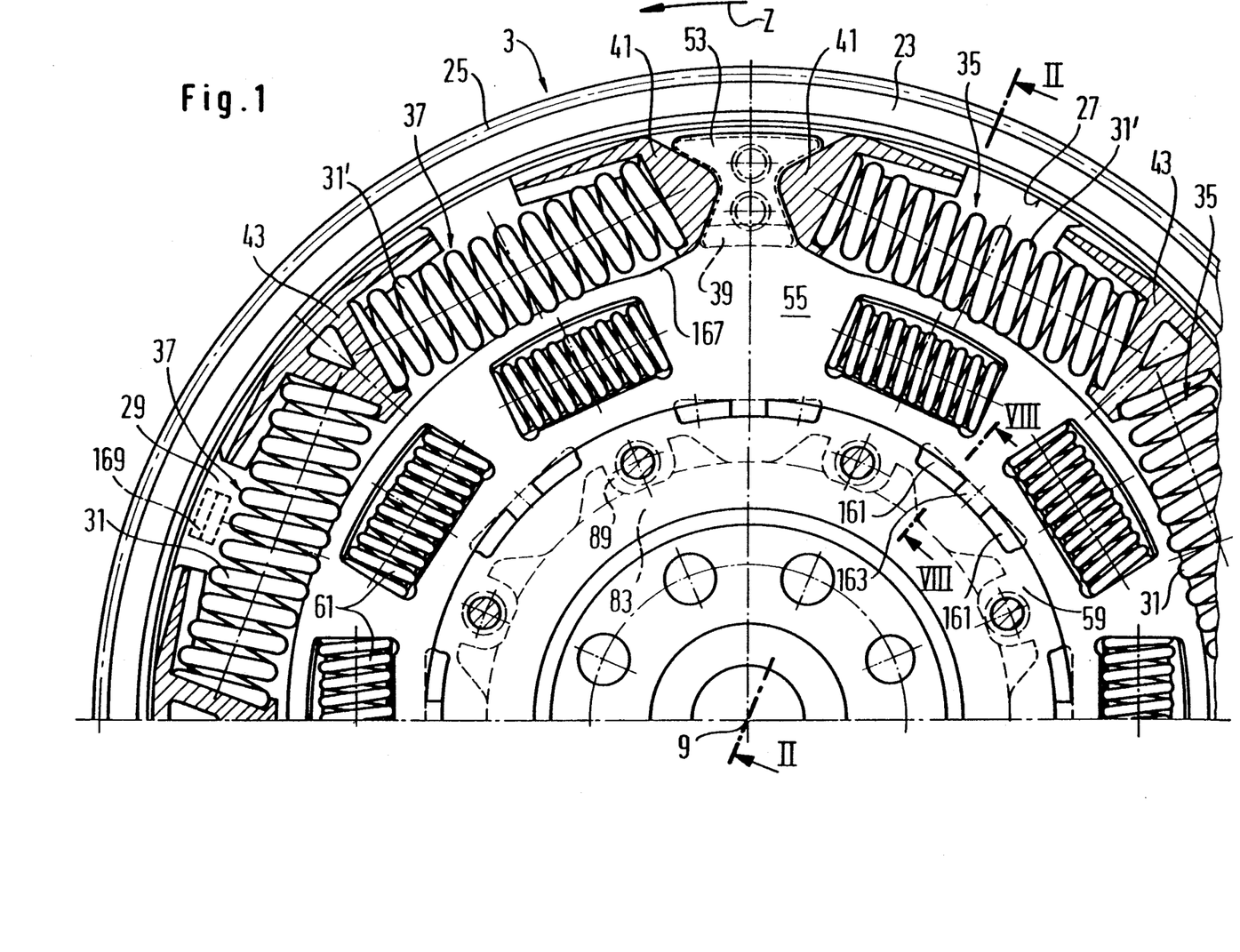
FIG. 1 shows a partial axial cross-section through a two-mass flywheel for the drive line of a motor vehicle.
Figure 2A:
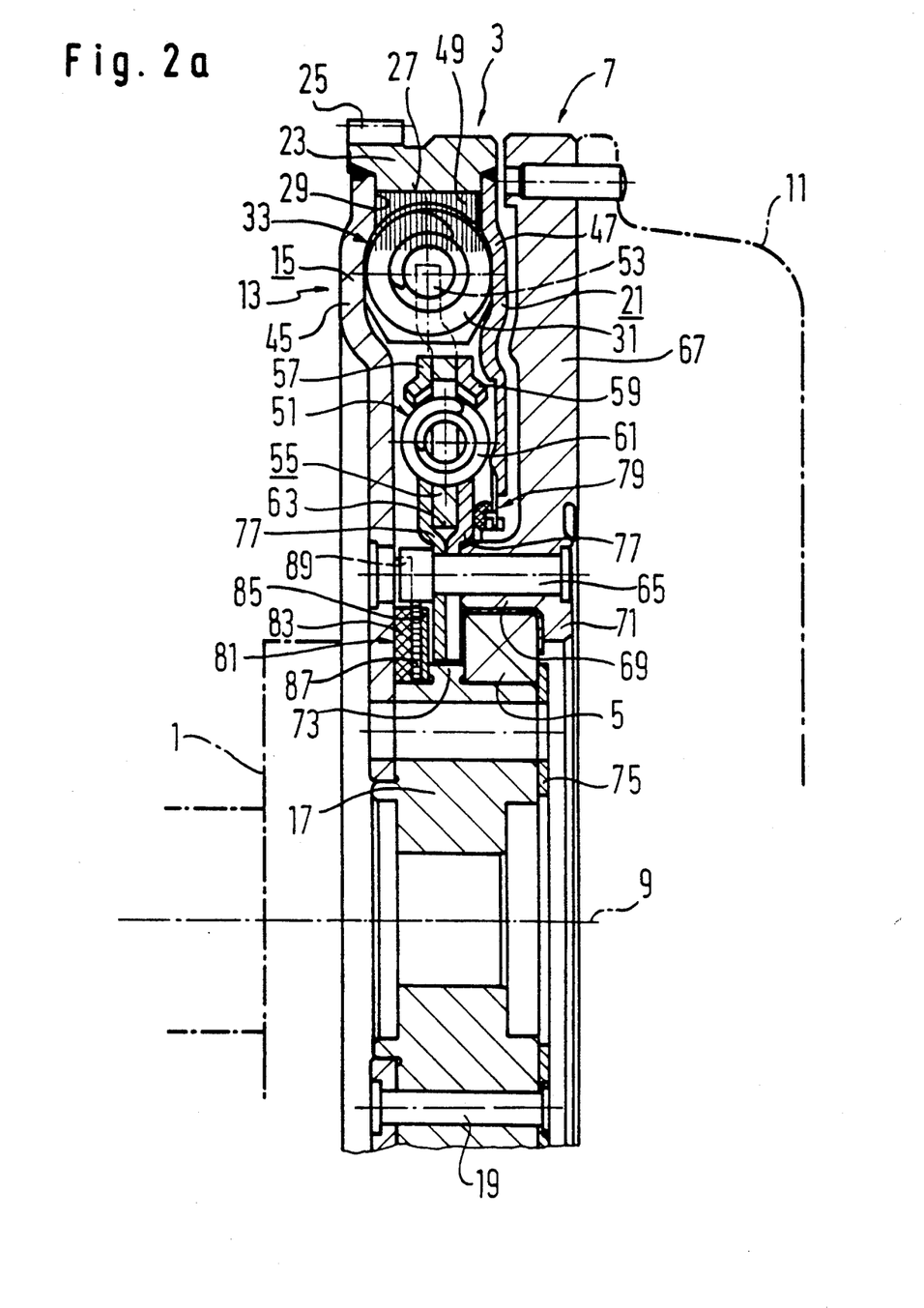
FIGS. 2a & 2b show a sectional view of the two-mass flywheel viewed along a line II—II in FIG. 1.
Figure 2B:
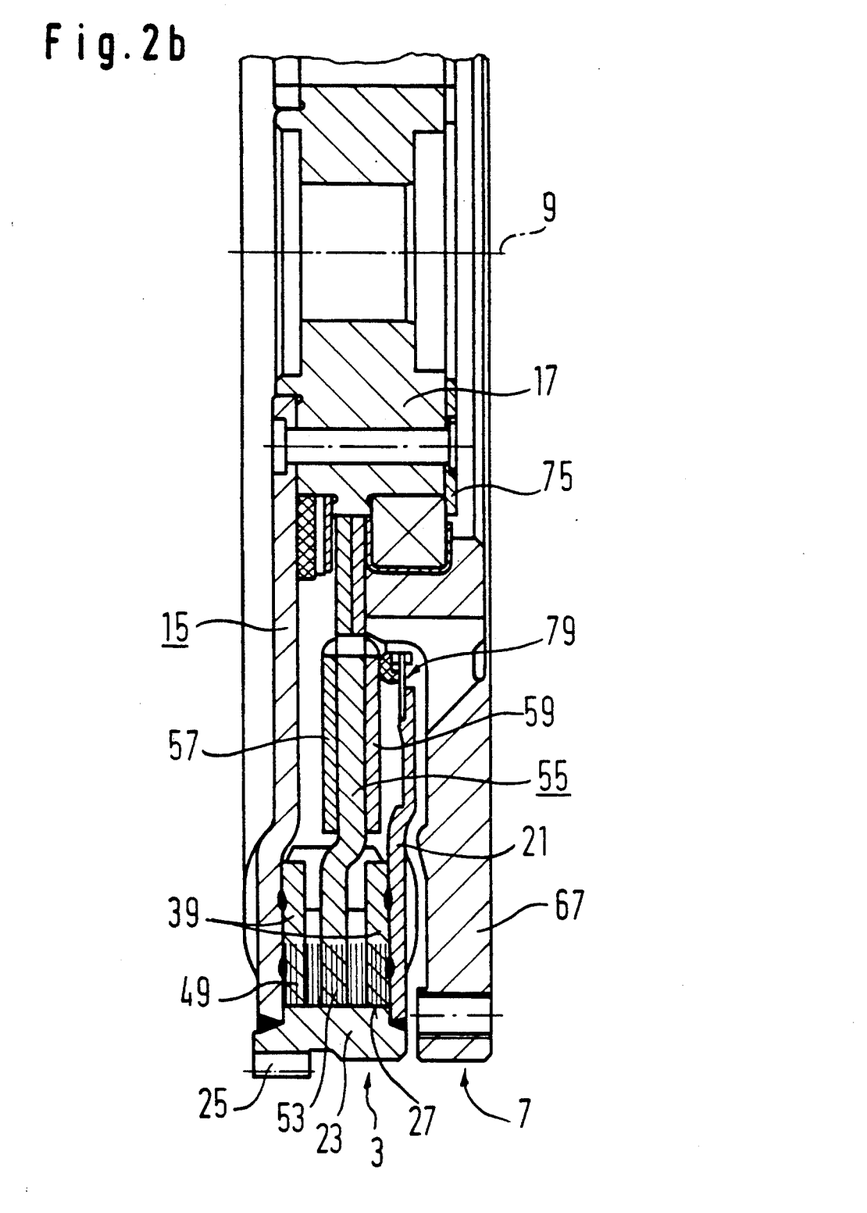

FIG. 1 shows a partially axial cross-section through a two-mass flywheel for the drive line of a motor vehicle, of which the upper half is shown in FIG. 2a while its bottom half is shown in axial longitudinal section in FIG. 2b. The two-mass flywheel comprises a first flywheel 3 adapted to be mounted on a crankshaft 1 of the internal combustion engine and on which, by means of a bearing 5, a second flywheel 7 is mounted to rotate about an axis of rotation 9 common with the crankshaft 1. The second flywheel 7 is substantially disc-shaped and carries a conventional friction clutch (FIG. 2a) indicated at 11 and of which it forms the counter-pressure plate. A torsional vibration damping means 13 couples the two flywheels 3, 7 to each other in torsionally elastic fashion.

The first flywheel 3 is composed of a plurality of parts, comprising a primary disc 15 which is rigidly connected by rivets 9 to a hub 17 which is separably mounted on the crankshaft 1. The flywheel 3 further comprises, disposed parallel with and at a distance from the primary disc 15 a cover disc 21 which in the region of its outer periphery is rigidly connected to the outer periphery of the primary disc 15 by a ring 23. Integral with the ring 23 on the outside is a starter ring gear 25. The ring 23 defines, by its circularly cylindrical inner wall surface 27 which is equiaxial with the axis of rotation 9, and together with the lateral surfaces of the primary disc 15 and cover disc 21 which in this area extend approximately at a right-angle thereto, a passage 29 concentric with the axis of rotation 9, in which coil springs 31 of a first spring stage 33 of the torsional vibration damping means 13 are disposed. As can be most clearly seen from FIG. 1, the first spring stage 33 comprises two identical and mirror-oppositely disposed spring sets 35, 37 which, as will be explained hereinafter, are disposed parallel with each other in the path of torque transmission. The spring sets 35, 37 are actuated by the first flywheel 3 through segments 39 (FIG. 2b) which are so disposed on the insides of the primary disc 15 and cover disc 21 that through interposition of in each case an end shoe 41 (FIG. 1) they act on the end springs 31' of each set of springs 35, 37. The individual springs 31 of each spring set 35 or 37, constructed as cylindrical coil springs, are in a peripheral direction braced inter se on sliding shoes 43. The radially outer portion of the sliding shoes 43 bears on the inner wall surface 27 of the ring 23. As especially FIGS. 2a and 2b show, the annular passage 29 formed by the ring 23, the primary disc 15 and the cover disc 21 is so formed in the axial direction that it accommodates and guides the springs 31. In the present case, the primary disc 15 and the cover disc 21 are provided with bulges 45, 47 so that the passage 29 is somewhat narrower radially outside and radially within the springs 31. However, it is readily possible for the passage 29 to be formed by parallel extending plane walls of the primary disc 15 and cover disc 21. As indicated at 49, the space 29 is filled with a viscous medium which serves particularly as a lubricant to reduce friction between the components which are adapted for movement in relation to one another.

Disposed radially within the area of the first spring stage 33 is a second spring stage 51 which is actuated by a hub disc 55 coupled via noses 53 to the end shoes 41 of the spring sets 35, 37. In the example of embodiment illustrated, the hub disc 55 comprises two radially projecting noses 53 which extend between the two end shoes 41 and, when the damper means 13 is at rest, have segments 39 which mask one another in the axial direction. Disposed axially on both sides of the hub disc 55 are two lateral discs 57, 59 which are torsionally elastically coupled to the hub disc 55 by springs 61 which are supported in windows both in the hub disc 55 and also in the lateral discs 57, 59. The hub disc 55 has, concentric with the axis of rotation 9, an aperture 63 into which the two lateral discs 57, 59 are shaped towards each other and in which the regions of the two lateral discs 57, 59 which are situated within the aperture 63 bear flat on each other. The lateral discs 57, 59 are furthermore rigidly connected in this region by rivets 65 to a plate part of the second flywheel 7 which forms the counter-pressure plate 67 of the clutch 11. In the riveting area, the counter-pressure plate 67 has projecting axially towards the primary disc 50 a shoulder 69 by which the counter-pressure plate 67 is placed and is axially fixed on the bearing 5. For axial fixing in one direction, the counter-pressure plate 67 has an integral radial flange 71 while in the other axial direction it is fixed by the radially inner portion of the two lateral discs 57, 59 which here bear flat on each other. The bearing 6 is axially fixed on the hub 17 by a radially projecting flange 73 on the hub 17 and by a disc 75 secured to the hub 17 by means of rivets 19.

In their portion which is formed into the aperture 63 in the hub disc 55, the two lateral discs 57, 59 each form an encircling edge 77 on which the hub disc 55 is radially guided, as will be described further hereinafter in connected with FIG. 8.

In the space between the radially inner end zone of the cover disc 21 and the flange 69 of the counter-pressure plate 67 there is a seal 79 which prevents the emergence of viscous material 49 and the ingress of dirt. Embodiments of the seal 79 will be explained in greater detail hereinafter with reference to FIGS. 5 and 6.

On the side axially remote from the bearing 5, in the region in which the lateral discs 57, 59 bear flat on each other, there is a friction device 81 which, in the example of embodiment illustrated, comprises a friction disc 83, an axially acting spring 85 and an intermediate disc 87 and which is clamped between the flange 73 and the primary disc 15. The friction device 81 is dimensioned for load operation and comes into action only after there has been a predetermined movement through an angle of relative rotation between the two flywheels 3, 7, for which purpose the friction ring 83 is in a peripheral direction coupled with clearance by extension pieces 89 to heads of rivets 65.

Figure 3A:
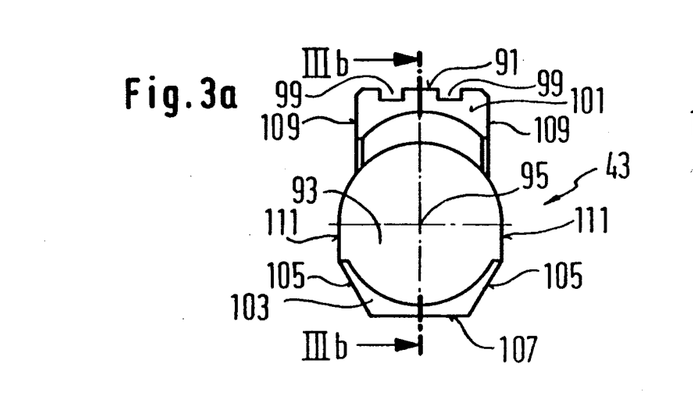
FIGS. 3a-3c show a sliding shoe in front view, longitudinal section along the line IIIb—IIIb in FIG. 3a and in plan view.
Figure 3B:
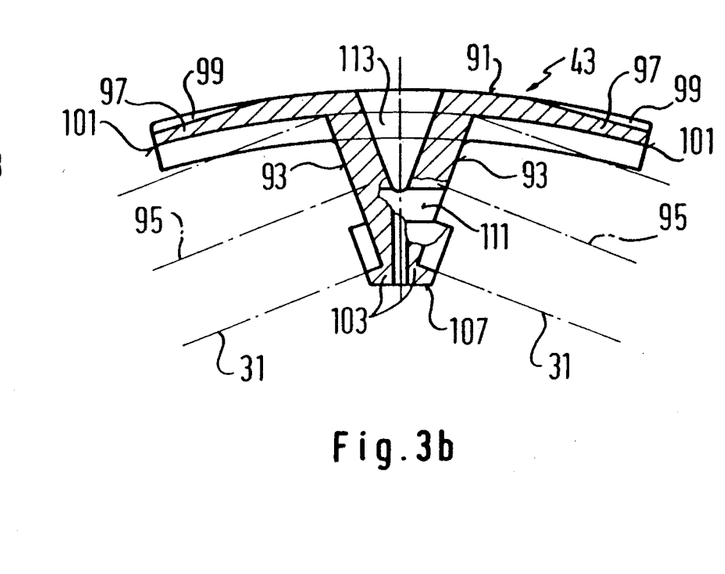
Figure 3C:
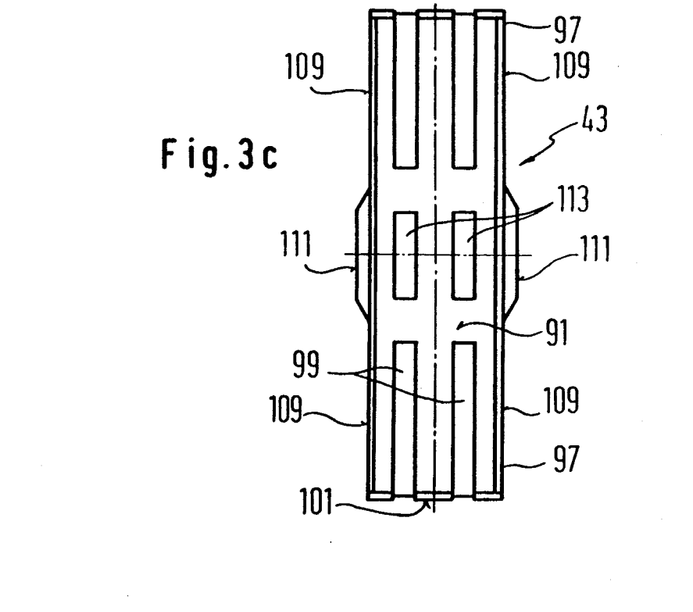

FIGS. 3a, 3b and 3c show a front view of one of the sliding shoes 43 viewed from the spring 31 which bears on it (FIG. 3a), a sectional view of the sliding shoe (FIG. 3b) and a plan view of the sliding shoe, viewed radially from the outside (FIG. 3c). Instead of a long and in particular pre-curved spring, the sliding shoes 43 make it possible to connect a plurality of short cylindrical springs one after another without these springs coming directly into frictional contact with the inner wall surface 27 of the first flywheel 3. Each sliding shoe 43 has a radially outwardly curved zone 91 the radius of curvature of which is either equal to or is slightly less than the radius of the inner wall surface 27. Each sliding shoe 43 has two plane spring supporting surfaces 93 which extend substantially at right-angles to the axis 95 (FIG. 3b) of the springs 31 and on which the ends of the springs 31 bear. On the radially outer side of the springs 31, the sliding shoe 43 is provided in both peripheral directions with extension members 97 which bias the springs 31 radially outwardly. The extension members 97 are radially outwardly provided with lubricating grooves 99. The lubricating grooves 99 are open radially outwardly, have their greatest depth in each case at the end 101 of the extension member 97 and run out to nothing in the direction of the middle of the sliding shoe 43. The lubricating grooves 99 serve to build up a wedge-shaped film of lubricant during relative movement between the sliding shoe 43 and the first flywheel 3.

As is most clearly shown in FIGS. 3a and 3b, the sliding shoe 43 has on the side of the spring axis 95 which is towards the axis of rotation spring guiding extension pieces 103 which guide the springs 31 radially inwardly. In the example of embodiment illustrated, the spring guiding extension pieces 103 extend over only a part of the peripheral length of the springs 31 and are closed outwardly by flat surfaces 105, 107. Alternatively, the outer surfaces can also be curved around the spring axis 95 and the spring guiding extension pieces 103 can if necessary extend as far as the extension members 97.

Each sliding shoe 43 has in the region of its extension members 97 lateral guide surfaces 109 by which it is axially guided on the primary disc 15 or cover disc 21. In its main part situated between the spring supporting surfaces 93, each sliding shoe 43 is provided with additional lateral guide surfaces 111 which are disposed substantially at the radial height of the spring axes 95. The guide surfaces 111 prevent a rotary movement of the sliding shoes 43 in the passage 29 in the first flywheel 3.

At least at the area 91 bordering on the inner wall surface 27 of the ring 23 the sliding shoes 43 are of slip-promoting construction to ensure the lowest possible friction. Additionally, the inner wall surface 27 is for example so treated by rolling that it has the smoothest possible surface. Rolling of the surface can result in this being to a certain extent compacted so that wear and tear are reduced and a very smooth surface is achieved. In their middle portion, the sliding shoes 43 are provided with recesses 113 in order to reduce their weight.

Upon a relative movement of the two flywheels 3, 7, the curved portions 91 of the sliding shoes 43 slide on the inner wall surface 27 of the first flywheel 3. The extension members 97 thereby reduce surface pressure in relation to the inner wall surface 27 and even at high rotary speeds guide the springs 31 at a distance from the inner wall surface 27. Thus, the springs 31 are unable to touch the inner wall surface 27. At the same time, the ends 101 act as an abutment to limit the angle of rotation so that a maximum compression of the springs 31 can be accurately maintained.

The end springs 31' (FIG. 1) which cooperate with the noses 53 on the hub disc 55 and with the segments 39 are biased via the end shoes 41 which are shown in detail in FIGS. 4a to 4d. In so far as directly relates to the components of the end shoes 41 which guide the springs 31', these are constructed similarly to the sliding shoes 43 but they only have an extension 115 which extends over the spring 31'. The extension member 115 is radially outwardly defined by a curved portion 117 the radius of curvature of which is adapted to the radius of the inner wall surface 27. Also, there are provided in the extension members 115 lubricating grooves 119 which correspond to the lubricating grooves 99. The end face 121 of the extension member 115 cooperates with the end face 101 of the (in the peripheral direction) adjacent sliding shoe 43 to serve as an abutment to limit the maximum compression of the spring 31'. For actuation by the segments 39 and the noses 53, the end shoe 41 is of prismatic shape and has, inclined at an angle γ in respect of each other, two prism surfaces 123, 125 which extend away from each other in a peripheral direction from the spring 31'. The prism surfaces 123, 125 are of substantially plane construction and extend parallel with the axis of rotation 9. The peripheral edges of the segments 39 or noses 53 which are intended to bear on the prism surfaces 123, 125 are adapted to match the prism surfaces 123, 125. The end spring 31' has its end face bearing on a flat spring supporting surface 127 and is guided opposite the extension member 115 radially inwardly by a spring guiding extension piece 129. The spring supporting surface 127 is flat and extends at a right-angle and if the two-mass flywheel is not under load, it extends substantially at a right-angle to the spring axis 95. Upon compression of the spring 31', the position of the spring axis changes in relation to the end shoe 41. Reference numeral 131 denotes a straight line which at maximum compression of the spring 31' extends at an acute angle φ to the spring axis 95, the straight line extending substantially in the direction of the spring axis under maximum compression. The angle β between the radially outer prism surface 123 and the spring supporting surface 127 is so dimensioned that, viewed in a sectional plane extending at right-angles to the axis of rotation 9, the straight line 131 passes on the one hand through the point of intersection of the prism surfaces 123, 125 in this sectional plane and at the other through the point of intersection of the spring supporting surface 127 and the spring axis 95. As a result of this geometrical fixing, the maximum loading of the end shoe 41 in the region of its prism surfaces 123 and 125 is minimal since with maximum application of force to the spring 31', i.e. when the maximum torque is being transmitted, the spring force is conducted into the centre of the prism in the direction of the straight line 131.

Figure 4A:
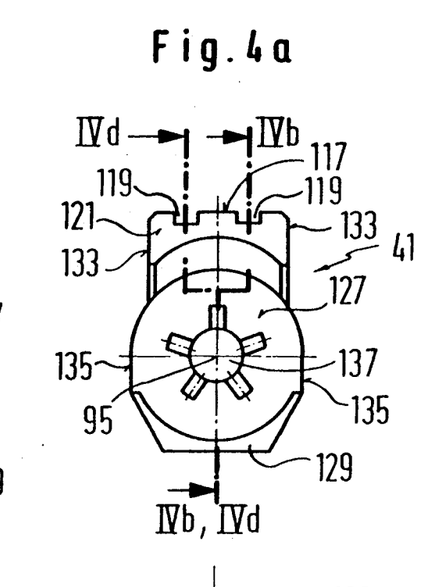
FIGS. 4a-4d show an end shoe in front view, longitudinal section (line IVb—IVb in FIG. 4a) and in plan view and a further partial longitudinal section (line IVd—IVd in FIG. 4a)
Figure 4B:
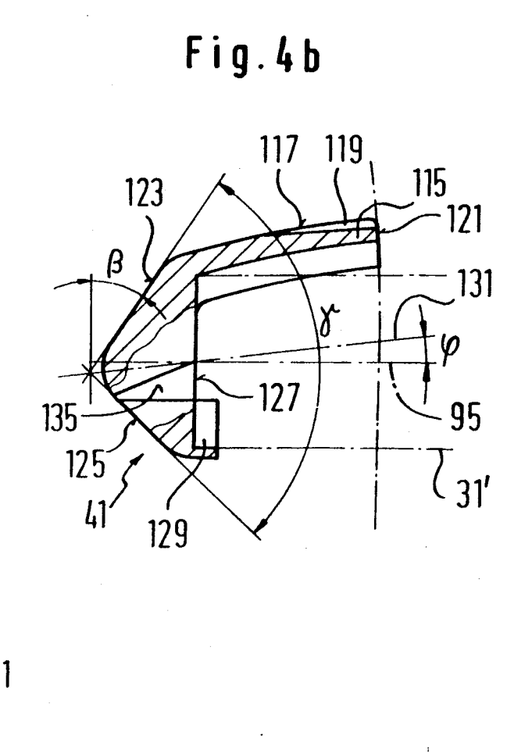
Figure 4C:
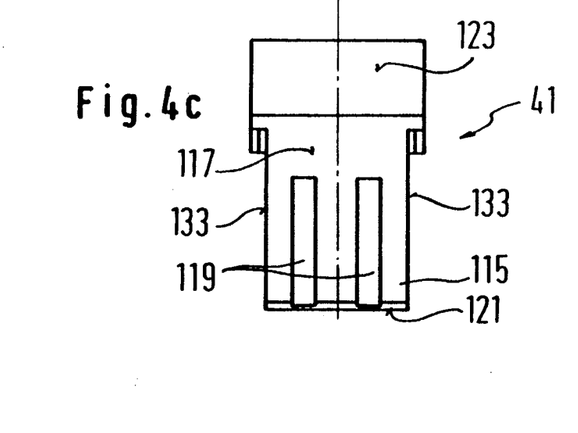
Figure 4D:
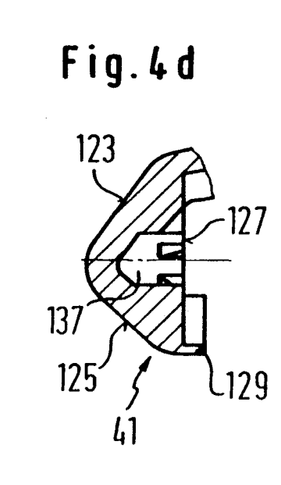

The spring guiding extension pieces 129 of the end shoes 41 are constructed in accordance with the spring guiding extension pieces 103 of the sliding shoes 43. In particular, the spring guiding extension piece can extend over only a part of the peripheral surface of the spring 31' and also its outer contours can be formed according to the spring guiding extension piece 103. Instead of the spring guiding extension pieces 129 which engage around the springs 31', it is possible, as also in the case of the sliding shoe 43, to provide centrally with the spring axis 95, a peg which engages the end of the spring. Certainly, the advantage of the spring guiding extension pieces 103, 104 is not then available in order for a plurality of coil springs to be disposed axially in one another. The end shoes 41, like the sliding shoes 43, are on the one hand guided by lateral surfaces 133 on their extension piece 115 and on the other by lateral surfaces 135 on their prismatic bodies on the primary disc 15 or cover disc 21 so that they cannot tilt. The lateral faces 135 are provided substantially at the radial height of the spring axis 95. To optimise weight, there is provided in the prism body a recess 137 as is best illustrated by FIGS. 4a and 4d.

The end shoes 41 are braced by means of their prism surfaces 123, 125 on the noses 53 of the hub disc 55 or segments 39 of the first flywheel 3 so that their convexly curved portion 117 does not come to bear on the inner wall surface 27 in the rest situation. This guarantees that at low torque levels, basic friction remains very small. By a suitable dimensioning of the angle β as a function of the friction coefficient between the end shoe 41 on the one hand and the likewise prismatic control edges of the noses 53 or segments 39 and furthermore as a function of the weight of the end shoe 41 and of the spring 31' guided thereon, it is assured that the end shoe 41 will under the action of centrifugal force move radially outwardly along the prism surface 123 at above a predetermined rotary speed, so that its convexly curved portion 117 will enter into frictional contact with the inner wall surface 27. In this way, as a function of the rotary speed, it is possible to control the use of an additional friction stage. Expediently, the conditions are such that frictional contact is established already at the idling speed of the internal combustion engine.

Figure 5:
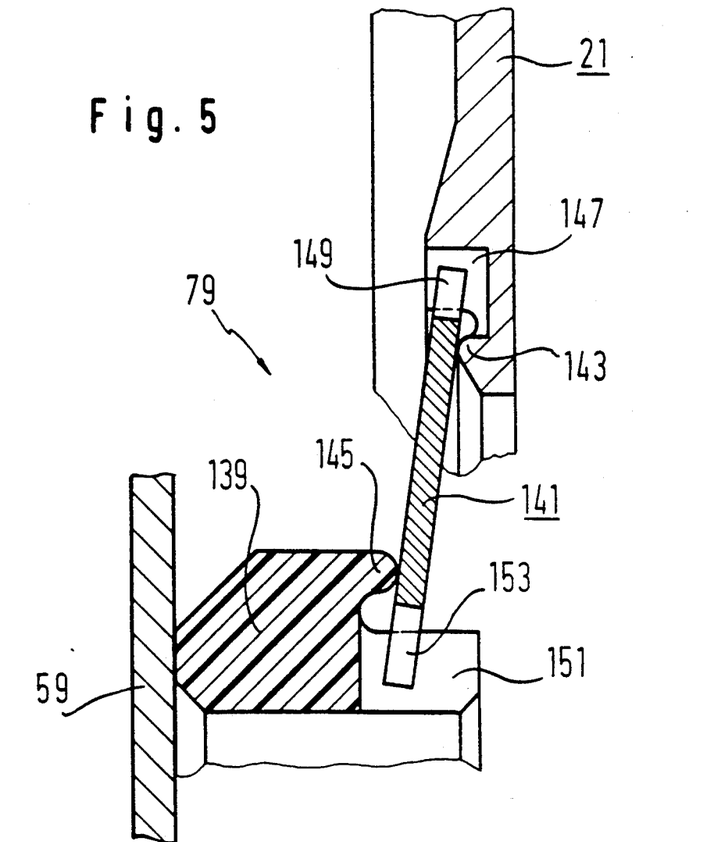
FIGS. 5 & 6 are partially sectional views through the seal area.

FIG. 5 shows details of the seal 79 between the cover disc 21 and its axially adjacent lateral disc 59. The seal 79 comprises an annular sealing element 139 which bears on the lateral disc 59 in the form of a motion seal, the sealing element 139 preferably consisting of an elastic material tensioned by an annular disc-shaped plate spring element 141 axially against the lateral disc 59. In the region of its outer periphery, the plate spring element 141 lies tightly against a sealing bead 143 on the cover disc 21 and in the region of its inner periphery it bears on a sealing bead 145 which is provided on the sealing element 139 on the side axially remote from the lateral disc 59. Radially outside the annular sealing bead 143, the cover disc 21 is provided with peripherally distributed recesses 147 engaged by noses 149 projecting from the outer edge of the plate spring element 141 as a safeguard against rotation. For its part, the sealing element 139 is rotationally rigidly guided on the plate spring element 141 and carries radially within the annular sealing bead 145 axially extending extension pieces 151 between which engage noses 153 which project radially inwardly from the plate spring element 141 to provide a safeguard against rotation. Instead of the safeguard against rotation which is provided by the plate spring element 141 in relation to the cover disc 21 and consisting of recesses 147 and noses 149, the plate spring element 141 can also be guided by friction to be rotationally rigid in relation to the sealing bead 143. The cover disc 21 and the plate spring element 141 usually consist of metal and thus have a higher coefficient of friction than the sealing element 139 which slides on the lateral disc 59.

Figure 6:
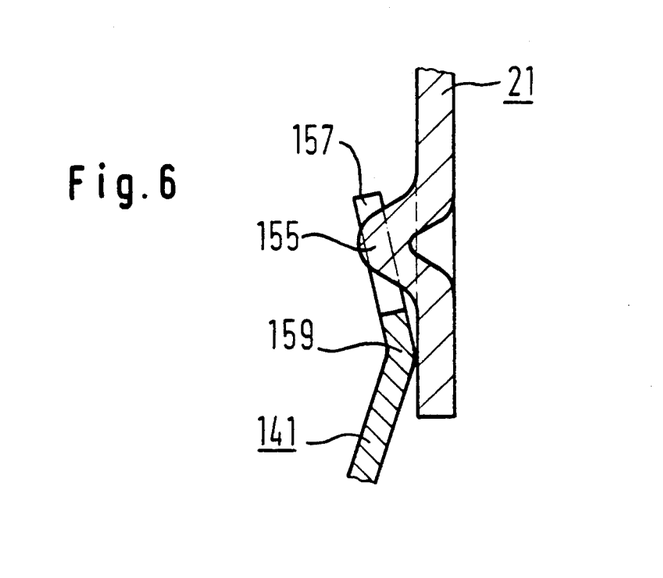

FIG. 6 shoes an alternative embodiment of seal 79 for sealing the plate spring element 141 in relation to the cover disc 21. The cover disc 21 is constructed as a comparatively thin-gauge sheet metal part and is provided with an encircling intermittent but tightly constructed corrugation 155. As a safeguard against rotation, the plate spring element 141 has radially projecting noses 157 which engage the breaks in the corrugation 155. Radially within the area of the corrugation 155 there is integrally formed on the plate spring element 141 a supporting bead 159 through which the plate spring element 141 bears on the cover disc 21 in a sealing-tight fashion.

Figure 8:
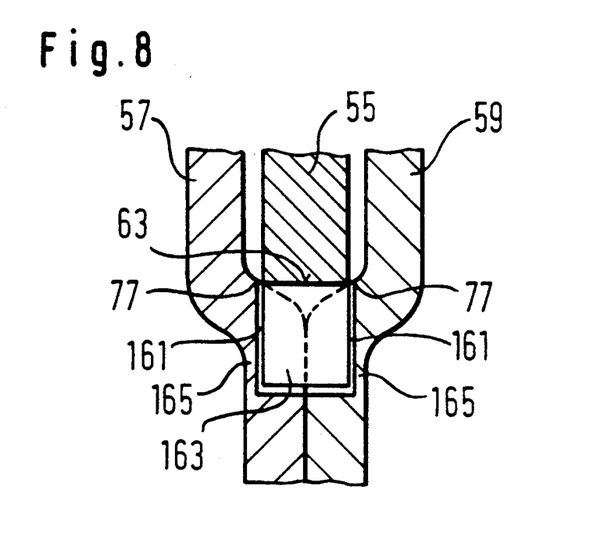
FIG. 8 is a sectional view through the guidance area of a hub disc viewed along a line VIII—VIII in FIG. 1.

FIG. 8 shows details of that portion of the lateral discs 57, 59 which guides the hub disc 55. The hub disc 55 has its central aperture 63 radially guided on the edges 77 of the lateral discs 57, 59. The edges 77 are formed in that the lateral discs 57, 59 are shaped towards each other within the aperture 63 and rest flat on each other in the radially inwardly adjacent area. In the region of the transition between the shapes of the lateral discs 57, 59, there are a plurality of peripherally distributed pockets 161 which overlap the aperture 63 in the hub disc 55 and which are provided in both the lateral discs 57, 59. The pockets 161 in the two lateral discs 57, 59 are disposed axially opposite to and accommodate a plurality of lugs 163 which project radially inwardly from the inner edge of the aperture 63 in the hub disc 55. In a peripheral direction, the pockets 161 form abutments to limit the rotation of the hub disc 55 in relation to the lateral discs 57, 59. The pockets 161 are in fact machined sufficiently deeply into the material of the lateral discs 57, 59 that on the one hand the axial mobility of hub disc 55 is not in jeopardy while on the other there always remains a thin-walled end piece 165 which prevents viscous material emerging at this point.

Figure 7:
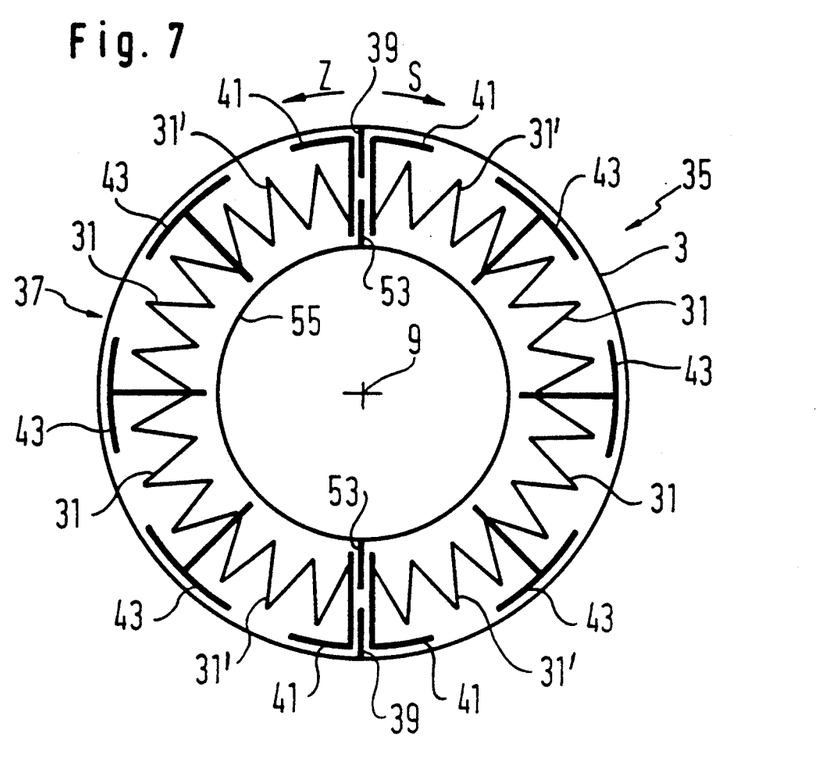
FIG. 7 is a view showing the principle of spring actuation.

FIG. 7 shows in principle the first spring stage 13 of the torsional vibration damping means. Between two substantially diametrically opposed noses 53 on the hub disc 55 and supported by in each case two end shoes 41 there are two sets of springs 35, 37 consisting of a plurality of serially disposed springs 31 which are braced on each other via the sliding shoes 43 and which are arranged in series. The end springs which bear on the end shoes 41 are again designated by reference numeral 31'. In the example of embodiment illustrated, there are in each set four springs but the number of springs may vary in so far as more than two springs are used and are braced on each other through a sliding shoe. Also the number of sets can vary. In an isolated case, a single set of springs may be provided or also more than two sets of springs may be used.

The springs of each set of springs may have the same stiffness. However, in a preferred embodiment at least one of the springs in each set of springs has a stiffness which differs from the stiffness of the other springs in the set. When using springs of different stiffness, the use of the friction emerging from the sliding shoes 43 can be influenced under control. If the spring 31' situated in first position in the path of torque has a greater spring stiffness than the spring behind it in the torque flow, then by virtue of the greater stiffness of this spring, the sliding shoe 43 which bears on the spring 31' initially moves together with the part initiating the torque, while the compression occurs in the region of the less stiff springs. If the torque is initiated through the first flywheel 3 while the internal combustion engine is under traction, i.e. in the direction of an arrow Z in FIG. 7, then the end spring 31' in the direction Z moves together with its end shoe 41 and the sliding shoe 43 bearing on it to a more or less rotationally rigid manner together with the flywheel 3. The end shoe 41 and the spring 31' thus do not perform any relative movement and the associated sliding shoe 43 performs only a minimal relative movement in relation to the flywheel 3. The result is that under traction, with low and medium torque levels, comparatively minimal friction is generated. The damping of torsional vibration can in this way be made more comfortable. On the other hand, if the end spring 31' of the spring set 35, which is at the top in FIG. 7, has an increased spring stiffness, i.e. a steeper spring characteristic in relation to the other springs of the spring set 35, then the same effect can be achieved in the pushing mode when torque is initiated into the flywheel 3 in the direction of the arrow S. In each case, the friction work is reduced when springs of greater spring stiffness are installed upstream of the springs of lesser stiffness, when viewed in the torque flow direction.

As FIG. 1 shows, in the rest position of the two-mass flywheel, the springs 31 and 31' have the radially inner portion of their spring windings supported with radial initial tension on the peripheral contours 167 of the hub disc 55 which extend between the noses 53. As a result of the radial initial tension, it is possible to install springs which are somewhat longer in a peripheral direction, so that the spring volume can in this way be increased. By suitable dimensioning of the initial tension in relation to the weight of the springs 31, however, it is ensured that at idling speed the springs 31, 31' will already have lifted off the peripheral contours 167 in order not to generate any additional friction in this state of operation.

As FIG. 1 shows, it is possible to provide outside the area of the springs 31, 31' in a peripheral direction between the extension members of the end shoes 41 or sliding shoes 43, supporting parts 169 via which, to limit the maximum compression of the springs 31, 31', the extension members abut one another. When such supporting or bracing parts 169 are used, the extension members may possibly be shortened so that it becomes possible to reduce the weight of the end shoes 41 or sliding shoes 43.

While specific embodiments of the invention have been shown and described in detail to illustrate the application of the inventive principles, it will be understood that the invention may be embodied otherwise without departing from such principles.

What we claim is:

1. A two-mass flywheel to be disposed in the drive line of a motor vehicle driven by an internal combustion engine, comprising:

a first flywheel (3) adapted to be mounted on a crankshaft (1) of the internal combustion engine for rotation about the axis of rotation (9) of the crankshaft (1);

a second flywheel (7) mounted to rotate about said axis relative to the first flywheel (3) and serving as a carrier for a friction clutch (11) in the drive line;

torsional vibration damping means (13) for coupling the two flywheels (3, 7) to each other in a rotationally elastic manner, said torsional vibration damping means including a plurality of coil springs (31) disposed on a common mean diameter in a passage (29) in the first flywheel (3) and extending arcuately about the axis of rotation (9);

said plurality of coil springs (31) including at least one set (35, 37) of at least two individual coil springs (31) which are connected in series and are disposed in the passage (29) one after the other;

a sliding shoe (43), movable relative to the two flywheels (3,7), positioned between mutually facing ends of peripherally adjacent coil springs (31) of each set (35, 37) for guiding the mutually facing ends of the adjacent coil springs (31) in the passage (29);

the ends of the coil springs (31') of each set (35, 37) which are outermost in the peripheral direction are, for the transfer of force, guided on end shoes (41);

the end shoes (41) and the sliding shoes (43) guide the coil springs (31) at a radial distance from an inner wall surface (27) of the first flywheel (3) which radially outwardly defines the passage (29); and the passage (29) is at least partially filled with a viscous material (49).

2. A two-mass flywheel according to claim 1, wherein at least one of the end shoes (41) and the sliding shoes (43) have, arcuately curved around the axis of rotation (9), radially outer guide surfaces (91, 117) which, at least during rotational operation, bear in sliding fashion on the inner walls surface (27) which radially outwardly defines the passage (29).

3. A two-mass flywheel according to claim 2, wherein:
at least one of the end shoes (41) and the sliding shoes (43) have, projecting in the peripheral direction, extension members (97, 115) which engage radially between the coil spring (31) and the inner wall surface (27); and
the radially outer guide surfaces (91, 117) at least approximately mask the extension members (91, 115) in the peripheral direction.

4. A two-mass flywheel according to claim 3, wherein:
at least one of the end shoes (41) and sliding shoes (43) have substantially plane supporting surfaces (93, 127) for the end of the coil spring (31), the supporting surface (93, 127) extending approximately at right-angles to the spring axis (95) and having a substantially circular contour; and
on the side of each supporting surface (93, 127) which is remote from the extension member (97, 115) there is a projecting spring guide extension piece (103, 129) which is shorter in the peripheral direction than the extension member (97, 115).

5. A two-mass flywheel according to claim 3, wherein:
at least in the region of the extension member (97, 115) there is in the arcuately curved radially outer guide surface (91, 117) of at least one of the end shoes (41) and sliding shoes (43) at least one lubricating groove (99, 119), the depth of which groove (99, 119) diminishes from that edge of the guide surface on the extension member (97, 117) which is situated above the coil spring (31) to the end of the coil spring (31).

6. A two-mass flywheel according to claim 5 wherein a plurality of axially adjacent lubricating grooves (99, 119) are provided on at least one of the end shoes (41) and sliding shoes (43).

7. A two-mass flywheel according to claim 2, wherein the radius of curvature of the areas of the radially outer guide surfaces (91, 117) of at least one of the end shoes (41) and sliding shoes (43) which are intended to bear on the inner wall surface (27) is equal to or slightly less than the radius of the inner wall surface (27).

8. A two-mass flywheel according to claim 2, wherein at least the portion of the guide surface (91, 117) of at least one of the end shoes (41) and sliding shoes (43) which is intended to bear on the inner wall surface (27) consists of a slip-promoting material.

9. A two-mass flywheel according to claim 8, wherein at least one of the end shoes (41) and the sliding shoes (43) consists of metal and is, at least in the region of the radially outer guide surface (91, 117) thereof, hardened or carries a coating of slip-promoting material.

10. A two-mass flywheel according to claim 8, wherein at least one of the end shoes (41) and the sliding shoes (43) is composed of a synthetic plastics material.

11. A two-mass flywheel according to claim 10, wherein at least one of the end shoes (41) and the sliding shoes (43) is produced from fibre-reinforced synthetic plastics material and, at least in the region of the radially outer guide surface (91, 117) thereof, comprises at least one of a slip-promoting coating and an admixture of slip-promoting material.

12. A two-mass flywheel according to claim 1, wherein at least one of the end shoes (41) and the sliding shoes (43) has, in the peripheral direction of the first flywheel (3), projecting extension members (97, 115) which extend radially between the inner wall surface (27) which radially outwardly defines the passage (29) and a region of the coil spring (31) which is adjacent the end of the coil spring (31) which is guided by the shoes (41, 43).

13. A two-mass flywheel according to claim 12, wherein the extension members (97, 115) of at least one of end shoes (41) and sliding shoes (43) form abutments (101, 121) which determine the maximum compression of the coil springs (31).

14. A two-mass flywheel according to claim 13, wherein in the peripheral direction of the first flywheel (3), between the extending members (97, 115) of the two shoes (41, 43) of at least one of the coil springs (31), there is a loosely displaceable bracing part (169) through which the extension members (97, 115) are braced on one another while limiting the compression of the coil spring (31).

15. A two-mass flywheel according to claim 1 wherein said viscous material comprises a lubricant.

16. A two-mass flywheel to be disposed in the drive line of a motor vehicle driven by an internal combustion engine, comprising:
a first flywheel (3) adapted to be mounted on a crankshaft (1) of the internal combustion engine for rotation about the axis of rotation (9) of the crankshaft (1);
a second flywheel (7) mounted to rotate about said axis relative to the first flywheel (3) and serving as a carrier for a friction clutch (11) in the drive line;
torsional vibration damping means (13) for coupling the two flywheels (3, 7) to each other in a rotationally elastic manner, said torsional vibration damping means including a plurality of coil springs (31) disposed on a common mean diameter in a passage (29) in the first flywheel (3) and extending arcuately about the axis of rotation (9);
said plurality of coil springs (31) including at least one set (35, 37) of at least two individual coil springs (31) which are connected in series and are disposed in the passage (29) one after the other;
a sliding shoe (43), movable relative to the two flywheels (3, 7), positioned between mutually facing ends of peripherally adjacent coil springs (31) of each set (35, 37) for guiding the mutually facing ends of the adjacent coil springs (31) in the passage (29); and
at least one of the coil springs (31') of at least one set (35, 37) having a spring stiffness which differs from the spring stiffness of the remaining coil springs (31) in the set (35, 37).

17. A two-mass flywheel according to claim 16, wherein the coil spring (31') with the greatest spring stiffness in the torque transmission path of the serially disposed coil springs (31) of the set (35, 37) is disposed in the first position in relation to the component of the torsional vibration damping means (31) which initiates the torque.

18. A two-mass flywheel to be disposed in the drive line of a motor vehicle driven by an internal combustion engine, comprising:

a first flywheel (3) adapted to be mounted on a crankshaft (1) of the internal combustion engine for rotation about the axis of rotation (9) of the crankshaft (1);

a second flywheel (7) mounted to rotate about said axis relative to the first flywheel (3) and serving as a carrier for a friction clutch (11) in the drive line;

torsional vibration damping means (13) for coupling the two flywheels (3, 7) to each other in a rotationally elastic manner, said torsional vibration damping means including a plurality of coil springs (31) disposed on a common mean diameter in a passage (29) in the first flywheel (3) and extending arcuately about the axis of rotation (9);

said plurality of coil springs (31) including at least one set (35, 37) of at least two individual coil springs (31) which are connected in series and are disposed in the passage (29) one after the other;

a sliding shoe (43), movable relative to the two flywheels (3, 7), positioned between mutually facing ends of peripherally adjacent coil springs (31) of each set of coil springs (35, 37) for guiding the mutually facing ends of the adjacent coil springs (31) in the passage (29);

the ends of the coil springs (31') of each set of coil springs (35, 37) which are outermost in the peripheral direction are, for the transfer of force, guided on end shoes (41);

the spring supporting surface (127) of each end shoe (41), in the inoperative position of the torsional vibration damping means (13), extends at least approximately at right-angles to the axis (95) of the coil spring (31'); and the torsional vibration damping means (13) guides the end shoes (41) on control elements (39, 53), the end shoes (41) and control elements (39, 53) having mutually associated and matchingly shaped prismatic guides of which every two—viewed in a plane at right-angles to the axis of rotation (9) and containing the axis (95) of the spring—have prism surfaces inclined towards each other, the prism surfaces (123, 125) of the end shoes (41) being so disposed in relation to the spring supporting surface (127) that a straight line (131) extending at one end through the point of intersection of the prism surfaces (123, 125) and at the other through the point of intersection of the spring axis (95) and the plane of the spring supporting surface (127) at an acute angle to the direction of the axis (95) of the spring, when the spring is at rest, extends at least approximately in the direction of the spring axis (95) at maximum compression of the coil spring (31').

19. A two-mass flywheel according to claim 18, wherein each end shoe (41) comprises an extension member (115) which engages radially between the coil spring (31') and the inner wall surface (27) of the first flywheel (3) which radially outwardly defines the passage (29) and which, when the torsional vibration damping means (13) is at rest, extends at a radial distance from the inner wall surface (27).

20. A two-mass flywheel according to claim 19, wherein the radially outer (123) of the two prism surfaces (123, 125) of the end shoes (41) extends at an angle to the spring supporting surface (127), said angle, the friction coefficients of the materials of the end shoe (41) and the control elements (39, 53) and the initial tension in the coil spring (31') are so selected that when a given working speed is exceeded due to centrifugal force, the extension member (115) moves radially outwardly and bears on the inner walls surface (27).

21. A two-mass flywheel to be disposed in the drive line of a motor vehicle driven by an internal combustion engine, comprising:

a first flywheel (3) adapted to be mounted on a crankshaft (1) of the internal combustion engine for rotation about the axis of rotation (9) of the crankshaft (1);

a second flywheel (7) mounted to rotate about said axis relative to the first flywheel (3) and serving as a carrier for a friction clutch (11) in the drive line;

torsional vibration damping means (13) for coupling the two flywheels (3, 7) to each other in a rotationally elastic manner, said torsional vibration damping means including a plurality of coil springs (31) disposed on a common mean diameter in a passage (29) in the first flywheel (3) and extending arcuately about the axis of rotation (9);

said plurality of coil springs (31) including at least one set (35, 37) of at least two individual coil springs (31) which are connected in series and are disposed in the passage (29) one after the other;

a sliding shoe (43), movable relative to the two flywheels (3,7), positioned between mutually facing ends of peripherally adjacent coil springs (31) of each set of coil springs (35, 37) for guiding the mutually facing ends of the adjacent coil springs (31) in the passage (19);

the torsional vibration damping means (13) including, for passing on the torque from the coil springs (31) of each set (35, 37) to the second flywheel (7), a hub disc (55) mounted to rotate in relation to the first flywheel (3) and having, for cooperating with the ends of the coil springs (31') of each set (35, 37) which is outermost in the peripheral direction, noses (53) which project radially outwardly;

the coil springs (31) are distributed around the periphery of the hub disc (55); and at least one coil spring (33) of each set (35, 37) bears with initial radial tension on the periphery of the hub disc (55) when the torsional vibration damping means (13) is in the rest position.

22. A two-mass flywheel according to claim 21, wherein the radial pretension is so attuned to the mass of the coil spring (33) which bears on the periphery of the hub disc (55) that, in operation, the coil spring (33) is lifted off the periphery of the hub disc (55) by centrifugal forces.

23. A two-mass flywheel according to claim 22, wherein at idling speed of the internal combustion engine, the coil spring (31) is already lifted off the periphery of the hub disc (55).

24. A two-mass flywheel to be disposed in the drive line of a motor vehicle driven by an internal combustion engine, comprising:

a first flywheel (3) adapted to be mounted on a crankshaft (1) of the internal combustion engine for rotation about the axis of rotation (9) of the crankshaft (1);

a second flywheel (7) mounted to rotate about said axis relative to the first flywheel (3) and serving as a carrier for a friction clutch (11) in the drive line;

torsional vibration damping means (13) for coupling the two flywheels (3, 7) to each other in a rotationally elastic manner, said torsional vibration damping means including a plurality of coil springs (31) disposed on a common means diameter in a passage (29) in the first flywheel (3) and extending arcuately about the axis of rotation (9);

said plurality of coil springs (31) including at least one set (35, 37) of at least two individual coil springs (31) which are connected in series and are disposed in the passage (29) one after the other;

a sliding shoe (43), movable relative to the two flywheels (3,7), positioned between mutually facing ends of peripherally adjacent coil springs (31) of each set of coil springs (35, 37) for guiding the mutually facing ends of the adjacent coil springs (31) in the passage (29);

the ends of the coil springs (31') of each set of coil springs (35, 37) which are outermost in the peripheral direction are, for the transfer of force, guided on end shoes (41);

a circularly cylindrical inner wall surface (27) of the first flywheel (3) radially outwardly defining the passage (29), substantially axially perpendicularly extending and substantially flat areas of side wall surface being adjacent to both sides of said circularly cylindrical wall surface (27); and at least one of the sliding shoes (43) and end shoes (41) provided for transfer of force to the outermost ends of the coil springs (31') of each set (35, 37) being adapted to match the contours of the radially outer portion of the passage (29) and being guided axially on the side wall surfaces.

25. A two-mass flywheel according to claim 24, wherein at least one of the end shoes (41) and sliding shoes (43) have, engaging radially between the coil spring (31) and the inner wall surface (27) which radially outwardly defines the passage (29), extension members (97, 115) which are axially guided on the side wall areas.

26. A two-mass flywheel according to claim 25, wherein at least one of the end shoes (41) and sliding shoes (43) has, in addition to the extension members (97, 115), additional lateral guide surfaces (111, 135) at the radial height of the spring axis (95).

27. A two-mass flywheel according to claim 24, wherein the first flywheel (3) is composed of a plurality of parts and comprises on the side of the internal combustion engine a primary disc (15) which is rigidly connected to a hub (17), a cover disc (21) disposed at a distance from the primary disc (15) on its side which is remote from the internal combustion engine and, connecting the primary disc (15) and the cover disc (21) in the region of their outer periphery, a ring (23) which together with the primary disc (15) and the cover disc (21) defines the passage (29).

28. A two-mass flywheel according to claim 27, wherein:

the ring (23) forms the inner wall surface (27) and is finely machined on the inner wall surface (27); and a starter gear ring (25) is formed in one piece on the outer periphery of the ring (23).

29. A two-mass flywheel according to claim 27, wherein:

the primary disc (15) and cover disc (21) include segments (29) coacting with the end shoes (41) for the transfer of force from the coil springs (31') to the first flywheel (3); and the end shoes (41) and the segments (39) have prism surfaces (123, 125) which are shaped to match one another.

30. A two-mass flywheel according to claim 29, wherein to transmit force from the end shoes (41) to the second flywheel (7) there is disposed axially between the primary disc (15) and the cover disc (21) and adapted for rotation in relation to the first flywheel (3), a hub disc (55) from which project noses (53) which likewise have prism surfaces to match the prism surfaces (123, 125) on the end shoes (41).

31. A two-mass flywheel to be disposed in the drive line of a motor vehicle driven by an internal combustion engine, comprising:

a first flywheel (3) adapted to be mounted on a crankshaft (1) of the internal combustion engine for rotation about the axis of rotation (9) of the crankshaft (1);

a second flywheel (7) mounted to rotate about said axis relative to the first flywheel (3) and serving as a carrier for a friction clutch (11) in the drive line;

torsional vibration damping means (13) for coupling the two flywheels (3, 7) to each other in a rotationally elastic manner, said torsional vibration damping means including a plurality of coil springs (31) disposed on a common mean diameter in a passage (29) in the first flywheel (3) and extending arcuately about the axis of rotation (9);

said plurality of coil springs (31) including at least one set (35, 37) of at least two individual coil springs (31) which are connected in series and are disposed in the passage (29) one after the other;

a sliding shoe (43), movable relative to the two flywheels (3, 7), positioned between mutually facing ends of peripherally adjacent coil springs (31) of each set of coil springs (35, 37) for guiding the mutually facing ends of the adjacent coil springs (31) in the passage (29);

the first flywheel (3) including a primary disc (15) and an annular cover disc (21) which axially define the passage (29);

axially between the primary disc (15) and the cover disc (21) and adapted to rotate in relation to the first flywheel (3) there is an annular hub disc (55) which, via the set (35, 37) of coil springs (31), is rotationally elastically coupled to the primary disc (15) and cover disc (21) and forms a first spring stage (33) of the torsional vibration damping means (13), the hub disc (55) having a central aperture (63);

axially on both sides of the hub disc (55) and radially within the area of the coil springs (31) of the first spring stage (33) there are two lateral discs (57, 59) which form radially outwardly directed ring edges (77) on which the central aperture (63) of the hub disc (55) is radially guided for rotation;

the lateral discs (57, 59) are rigidly connected to the second flywheel (7); and the lateral discs (57, 59) are rotationally elastically coupled to the hub disc (55) by further springs (61) which form a second spring stage (51) of the torsional vibration damping means (13) which is disposed in series with the first spring stage (33).

32. A two-mass flywheel according to claim 31, wherein the two lateral discs (57, 59), within the central aperture (63) in the hub disc (55), are shaped axially towards each other, rest flat on each other in the aperture (63), and are rigidly fixed to the second flywheel (7) by rivets (65).

33. A two-mass flywheel according to claim 32, wherein the hub disc (55) has, projecting radially inwardly from its central aperture (63), lugs (163) which, in order to limit the angle of rotation of the second spring stage (51), engage pockets (161) which extend from the ring edges (77) radially into the adjacently disposed area of the lateral discs (57, 59).

34. A two-mass flywheel according to claim 33, wherein the pocket (161) in each lateral disc (57, 59) is narrower in the axial direction than the thickness of the material used for the lateral disc (57, 59) and is axially closed.

35. A two-mass flywheel according to claim 32, wherein:
the second flywheel (7) has, in the region of the rivets (65) and extending through the central aperture in the cover disc (21) as far as the mutually contacting area of the lateral discs (57, 59), a shoulder (69) fitted on a bearing (5) mounted on the hub (17) of the first flywheel (3); and
the second flywheel (7), on the side axially remote from the first flywheel (3), is axially fixed on the bearing (5) by an annular flange (71) integral with the second flywheel (7) and on the side axially facing the first flywheel (3) is fixed by the riveted-on mutually contacting areas of the two lateral discs (57, 59).

36. A two-mass flywheel according to claim 32, wherein between the radially inner portion of the cover disc (21) and the lateral disc (59) closest to the second flywheel (7) there is radially between the springs (61) of the second spring stage (61) and the rivets (65) an annular axially resilient seal (79) which is rotatably against the lateral disc (59) while being non-rotatably braced against the cover disc (21).

37. A two-mass flywheel according to claim 36, wherein the seal (79) comprises, bearing against the lateral disc (59), an annular sealing element (139) and a plate spring element (141), the inner edge of the plate spring element (141) being guided on the sealing element (139) while the outer edge thereof is rotationally rigidly guided on the cover disc (21).

38. A two-mass flywheel according to claim 37, wherein:
the plate spring element (141) and the cover disc (21) bear on each other via an annularly closed supporting bead (143, 159) on at least one of the plate spring element (141) and the cover disc (21); and
means (147, 149, 155, 157) for providing a safeguard against rotation are provided radially outside the supporting bead (143, 159).

39. A two-mass flywheel according to claim 38, wherein:
the supporting bead (143) is integrally formed on the cover disc (21); and
the cover disc (21) has distributed in a peripheral direction and radially outside of the supporting bead (143) a plurality of recesses (147) engaged by noses (149) which project radially from the plate spring element (141).

40. A two-mass flywheel according to claim 39, wherein the recesses (147) are provided in an area of the cover disc (21) which projects axially towards the second spring stage (51).

41. A two-mass flywheel according to claim 37, wherein:
the cover disc (21) is constructed as a shaped sheet metal part and has, projecting towards the primary disc (15) and intermittent in a peripheral direction, a corrugation (155); and
the plate spring element (141) has on a smaller diameter than that of the corrugation (155) an annularly closed supporting bead (159) by which it resets directly on the cover disc (21), and also has outwardly projecting noses (157) which engage the breaks in the corrugation (155).

42. A two-mass flywheel according to claim 37, wherein:
the sealing element (139) has directed away from the lateral disc (59) and in its radially outer portion an encircling sealing bead (145) on which the radially inner portion of the spring plate element (141) rests with an axial initial tension; and
the sealing element (139) has in its radially inner portion and projecting axially beyond the sealing bead (145), an extension piece (151) having distributed in the peripheral direction gaps engaged by the radially inwardly projecting noses (153) on the plate spring element (141).

\* \* \* \* \*

UNITED STATES PATENT AND TRADEMARK OFFICE
CERTIFICATE OF CORRECTION

PATENT NO. : 5,307,710
DATED : May 3, 1994
INVENTOR(S) : Reinhard Feldhaus et al.

It is certified that error appears in the above-indentified patent and that said Letters Patent is hereby corrected as shown below:

Col. 11, line 25, "$\phi$" should read --$\gamma$--.

Signed and Sealed this

Sixth Day of December, 1994

Attest:

BRUCE LEHMAN

Attesting Officer          Commissioner of Patents and Trademarks